United States Patent [19]
Mühlinghaus

[11] Patent Number: 5,522,173
[45] Date of Patent: Jun. 4, 1996

[54] DEVICE FOR TRAPPING, OBSERVING AND TRANSPORTING INSECTS, SPIDERS AND OTHER SMALL ANIMALS

[76] Inventor: Heinrich Mühlinghaus, Goethestrasse 46, 45549 Sprockhövel, Germany

[21] Appl. No.: 202,292

[22] Filed: Feb. 25, 1994

[30] Foreign Application Priority Data

Mar. 17, 1993 [EP] European Pat. Off. .............. 93104330

[51] Int. Cl.[6] .............................. A01M 3/00; A01M 5/02
[52] U.S. Cl. ................................ 43/134; 43/137
[58] Field of Search ............................ 43/110, 134, 135, 43/137, 133

[56] References Cited

U.S. PATENT DOCUMENTS

| | | | |
|---|---|---|---|
| D. 199,067 | 9/1964 | Laberge | 43/110 |
| 1,750,163 | 3/1930 | Disney | 43/134 |
| 3,494,067 | 2/1970 | Potrzuski | |
| 4,272,906 | 6/1981 | Liebling | 43/134 |
| 4,850,133 | 7/1989 | Burzdak | 43/137 |
| 5,207,018 | 5/1993 | Reaver | 43/134 |
| 5,271,178 | 12/1993 | Eckard | 43/134 |
| 5,305,546 | 4/1994 | Edwards | 43/134 |

FOREIGN PATENT DOCUMENTS 9012348  12/1990  Germany.

*Primary Examiner*—Kurt Rowan
*Attorney, Agent, or Firm*—Snell & Wilmer

[57] ABSTRACT

A catching device (1), a grip (7), a flexible slide plate (4) for closing the catching opening (6) and an operating button (5) for sliding the flexible slide plate constitute the catching device. The grip part of the grip casing is narrower than the catching casing, so that the flexible slide plate comprises a narrow sliding portion (4b) and a wide closing portion (4a) and correspondingly the grip has a widened portion (7a) and a narrower grip portion (7b). The catching device with a guide plate (11) shaped onto its rear wall is attached to the end wall (14) of the vertically divided grip by means of a clamping holder (10). The individual components of the device are provided with a system of guide elements integrated into the same, mainly holding-down strips on the operating button, lateral guide strips (22) in the narrow grip portion, the guide in the reversal area of the flexible slide plate on the bevel (7c) of the grip on guide ribs (24), guide strips (25) and guide plates (11), as well as on guide edges (26) and guide noses (27) on the catching opening.

27 Claims, 17 Drawing Sheets

Schnitt I-I

Schnitt II-II

DEVICE FOR TRAPPING, OBSERVING AND TRANSPORTING INSECTS, SPIDERS AND OTHER SMALL ANIMALS

TECHNICAL FIELD OF THE INVENTION

The invention relates to a device for trapping, observing and transporting insects, spiders and other small animals, comprising a catching apparatus open on one side and closable with the aid of a flexible slide plate and a grip mechanism connected thereto, in which the flexible slide plate is guided in a twice reversed (curved) path supporting its top and bottom to the catching opening of the catching apparatus and is displaceable by an operating button.

BACKGROUND OF THE INVENTION

Small animals or creatures, such as insects, spiders, beetles, etc. are generally undesired in certain locations, e.g. in living quarters for human beings, food storage areas, etc., and therefore must be removed from these places. However, such creatures are interesting instructional observation objects in particular for small children. In these and similar cases the creatures optimally are trapped and following transportation to an appropriate location or after observation are released uninjured into the countryside.

As the catching of such insects by hand is not always successful and problems occur both for the human being and the insect when the latter is picked up with the fingers, devices and equipment have been developed for facilitating the picking up of the insect and prevents direct contact between the human being and the insect, whilst excluding any risk of injury for both parties.

In a known device of this type (German Utility Model 90 12 348.4) a catching apparatus open at the bottom is connected on the rear wall to an upwardly bent grip or handle, in which is guided a flexible, plastic or steel foil slide plate and by means of an operating button movably arranged on the grip can be displaced, in order to close with the flexible slide plate the catching opening of the catching apparatus, after the latter has been inverted over a creature to be caught and the in this way trapped, uninjured creature can be released again, if desired, at another location after observation and/or transportation. The guidance of the flexible slide plate from the grip to the catching opening takes place in a twice, oppositely bent (curved) path between webs arranged perpendicular to the grip and in a U or L-guide in the catching apparatus.

The handling of this known device causes problems in that the very thin, flexible slide plate under the action of the pushing force on its twice reversed curved guide path tends to bulge and camber, so that it is not always possible to ensure the function of the sliding mechanism and in particular the correct closing of the catching opening. However, a thicker closing element would make the sliding process more difficult and would also not ensure the uninjured reception of the insect or creature to be trapped.

The handleability of such known devices is also impaired in that the width of the grip corresponds to that of the catching apparatus and therefore either the grip or handle is too wide and the device is made uneasy to handle, or the catching apparatus is too narrow and therefore inappropriate for the catching process. There are also manufacturing problems in the case of these known devices.

The present invention addresses these and other problems, and provides an easily manufactured and assembled device of the aforementioned type in such a way that easy handling is ensured during catching, accompanied by an injury-free reception of the creature and a troublefree operation of the closing mechanism.

SUMMARY OF THE INVENTION

The present invention addresses the problems of the prior art devices. In general, the present invention is based on the idea that a flexible slide plate is supported in guide elements shaped in one piece on a grip, that friction is low, i.e. easy mobility of the slide plate is ensured, whilst at the same time preventing a buckling of the thin foil or film on closing the catching opening, i.e. on moving the flexible slide plate.

In accordance with a preferred aspect of the present invention, this is brought about by guide rails shaped onto the insides of the vertically divided grip and arranged to form a slot, remote from the catching apparatus, whilst the general fault-prone guidance of the flexible slide plate in the reversal area is occasioned by a bevel suitably positioned in proximity of the bottom face of the grip which interacts with a portion of one of the lateral guide rails. Preferably, reinforcing ribs are also formed on the grip which serve to centrally guide the slide plate as it closes the opening. The correct closure of the catching opening of the catching apparatus is also assisted in that the flexible slide plate is given a slight upward movement at the start of the closing process on the downwardly bent part of the grip located on the catching apparatus and on a tapering guide nose placed on the inside of the lateral, lower edges of the catching apparatus, so that the flexible slide plate, under tension, passes along a guide edge formed on the lower border of the catching apparatus and engages against the borders of the catching opening in the closed position. The guide edge for the flexible slide plate provided on the catching apparatus in the closing direction increasingly approaches the lower edge of the catching apparatus, so that at the end of the closing process the distance between the bearing surface on which the creature to be trapped is located, and the slide plate is so small that there is no injury risk for said creature.

During the closing process the flexible slide plate is laterally guided in all areas of the grip and on the top and bottom and in the particularly endangered areas is centrally supported, so that there is no need to fear an upward or downward giving way of the flexible slide plate.

The manufacturing costs for the proposed trapping device are low, because all the guide elements are one-piece shaped components of the necessary parts, namely the grip, catching apparatus and operating button. Moreover, the assembly of the catching device is easy, because it is merely necessary to join together the five individual components in the sequence first grip half, slide plate, operating button, catching apparatus and second grip half and then the two grip halves are joined in an appropriate manner, namely by ultrasonic welding or in detachable manner by a screwing or locking connection.

According to a particularly preferred feature of the invention the catching apparatus is constructed as a separate member with a T-shaped clamping holder shaped onto its rear wall and a guide plate shaped onto said holder. Advantageously, the catching apparatus is fixed in non-rotary manner to the front end wall of the grip by a shallow protuberance on the rear wall of the catching apparatus and a corresponding depression on the end wall of the grip, the guide plate only projecting through the slot in the end wall into the interior of the grip. This significantly simplifies manufacture and assembly.

According to a still further preferred aspect of the present invention the catching apparatus is wider than the grip, so that the handling of the device is improved because on the one hand the catching opening is larger and can consequently more easily be placed on larger insects and on the other hand the grip has a more suitable shape. To this end, the flexible slide plate preferably comprises a wide closing portion for the catching opening and a narrow sliding portion corresponding to the width of the grip part of the grip. As a result of this construction the grip comprises a widened portion, corresponding to the width of the closing portion of the flexible slide plate, where the curved path of the slide plate in the grip part is adjacent to the catching apparatus and a narrower, handy grip portion, to whose width is matched the dimensions of the sliding portion of the flexible slide plate. An optimally wider construction of the catching apparatus and therefore the slide plate is also made possible by the present invention in that two or more guides are shaped onto the clamping holder of the catching apparatus.

In an advantageous development of the present invention onto the operating button for the slide plate is shaped a driving pin, which engages in a bore of the flexible slide plate so as to be able to move the latter. According to another feature of the invention, on the driving pin are located a holding-down device directed toward the guide plate, so as to additionally counteract a bulging or cambering of the flexible slide plate.

By means of the device proposed by the invention a catching device is made available, which is easy to manufacture and assemble, whilst also being easy to operate. The guidance of the closing element constructed as a flexible slide plate necessary for the operation of the catching device takes place from the operating grip or handle via the grip to the catching apparatus by means of a system of guide elements integrated into said components and which decisively determine the limited manufacturing costs and the easy, trouble-free operability and finally permit the safe and undamaged trapping of the insects, beetles, etc.

BRIEF DESCRIPTION OF THE DRAWINGS

A non-limitative embodiment of the invention is described in greater detail herein after relative to the attached drawings, wherein like elements are denoted by like designations, and.

DETAILED DESCRIPTION OF PREFERRED EXEMPLARY EMBODIMENTS

Figure 1:
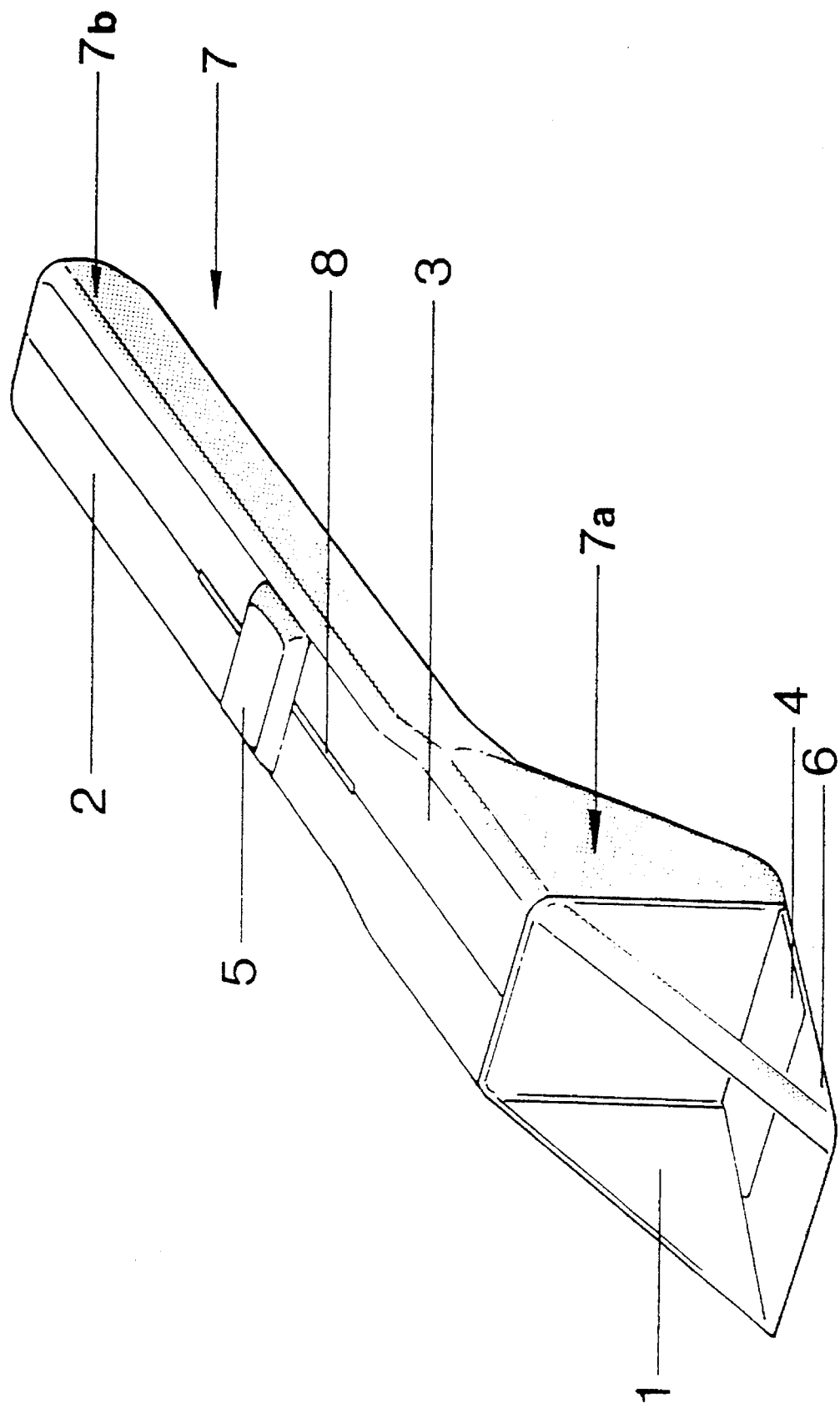
FIG. 1 is a perspective view of a catching device according to the present invention.
Figure 4:
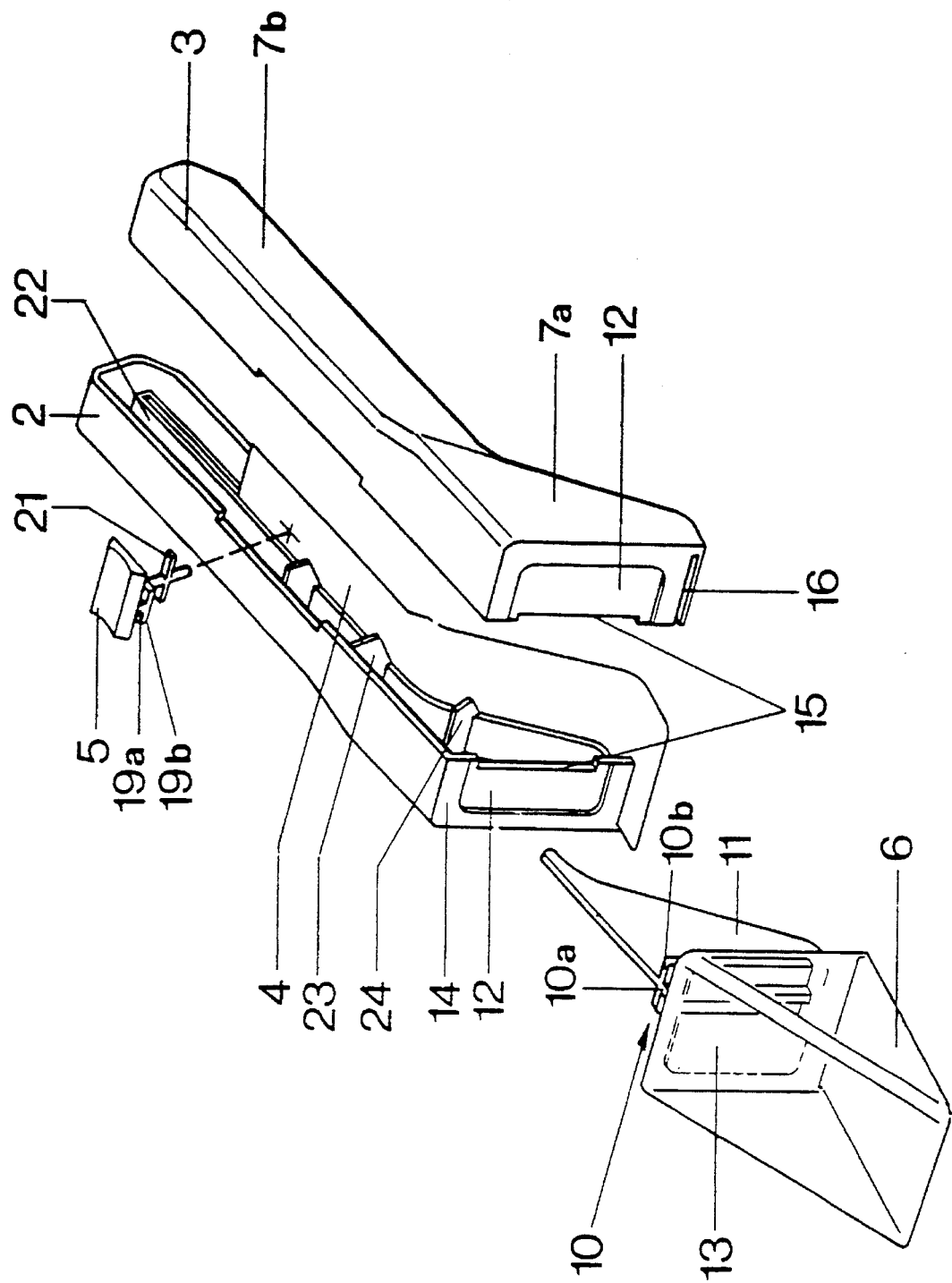
FIG. 4 is a perspective view of the catching device with the individual components disassembled.

The device for trapping, observing and transporting insects, beetles, spiders and other small creatures comprises, as can be seen in FIGS. 1 and 4, a catching apparatus (housing) 1, a grip 7 formed from two grip halves 2 and 3, a flexible slide plate 4 serving as the closing element for the catching apparatus and guided in the grip 7, and an operating button 5 slidably guided in a movement slot 8 for the movement of the flexible slide plate 4 in order to close or reopen the catching opening 6 of the catching apparatus 1.

Housing 1 preferably comprises a hollow body made in one piece from clear, i.e. transparent, plastic, on whose underside is provided opening 6 and whose rear wall 13 has a shallow protuberance 9 (FIGS. 9 and 10) as well as a cross-sectionally T-shaped clamping holder 10 connected thereto for connecting catching housing 1 to grip 7. Guide 11 is connected to the clamping holder 10. If desired, catching apparatus 1 can also be made from a matt, merely translucent material.

Grip 7, preferably comprising grip halves 2 and 3, preferably is formed by a widened portion 7a corresponding to the width of the catching apparatus 1 and a narrower grip portion 7b. The two grip halves 2 and 3 are suitably engaged with one another, such as by means of a groove and tongue joint, and are firmly interconnected in the grip area by ultrasonic welding. However, it is also possible to have a detachable connection, in which grip halves 2 and 3 are screwed or locked together.

As shown best in FIG. 4, grip 7 has on its end wall 14, facing rear wall 13 of catching housing 1, a shallow depression 12, whose shape and dimensions correspond to those of protuberance 9 on rear wall 13. Preferably, in the center of end wall 14 there is also a vertical slot 15 for receiving the web 10a of the T-shaped clamping holder 10. A horizontal guide slot 16 is provided on the lower border of end wall 14 for guiding the flexible slide plate 4.

Catching housing 1 and the grip 7 are interconnected by a joining process, in which T-shaped clamping holder 10 with its flange 10*b* is fixed to the inside of end wall 14 (FIG. 2) and is held by web 10*a* in vertical slot 15 in the end wall 14. To further secure against rotation of catching apparatus 1 with respect to grip 7, shallow protuberance 9 on rear wall 13 engages in shallow depression 12 of the end wall 14 and therefore ensures a firm seating.

Figure 2:
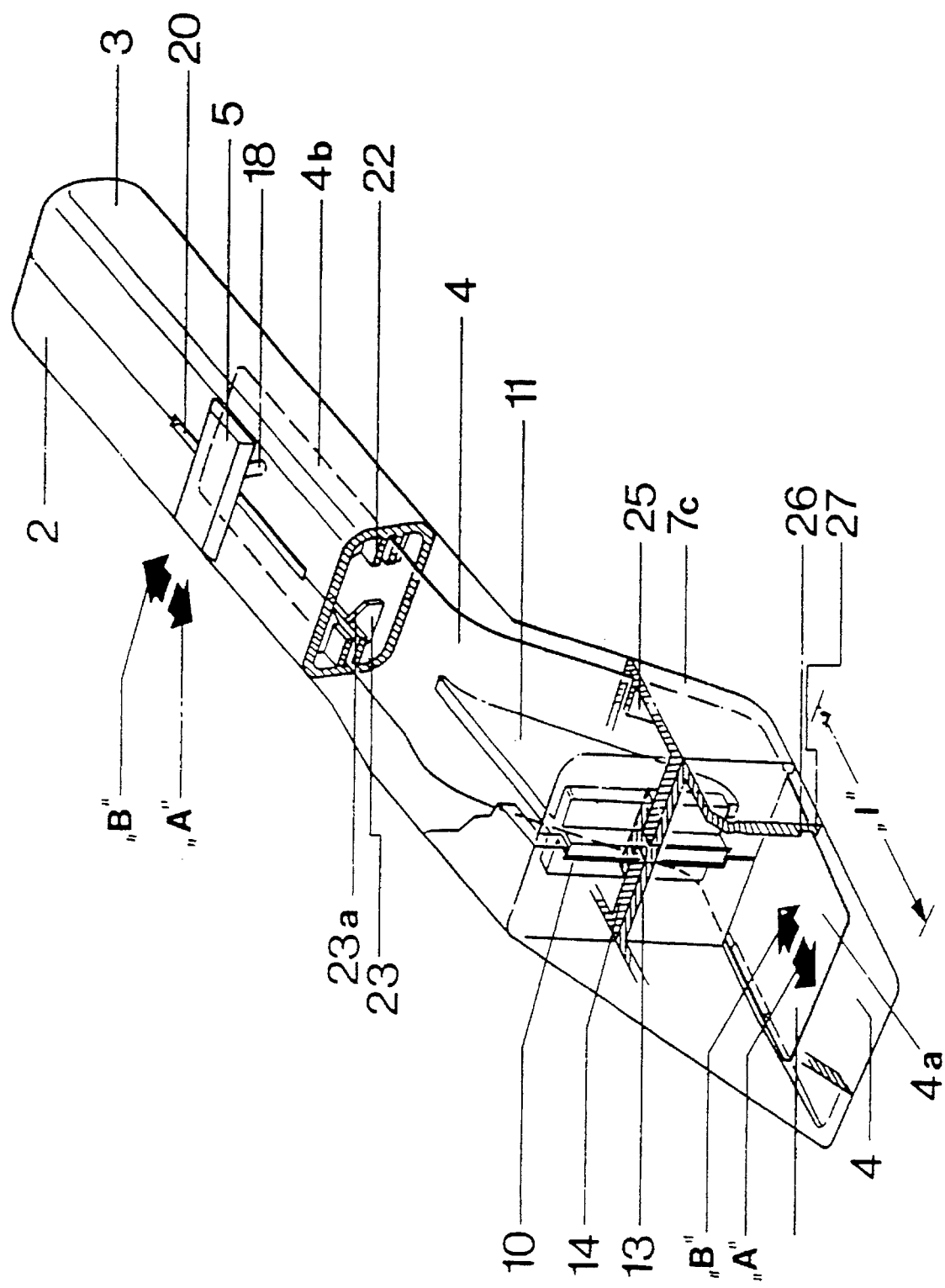
FIG. 2 is a perspective view of the proposed device for trapping, observing and transporting insects and similar small creatures, but shown partly in section for showing the interior of said device.
Figure 3:
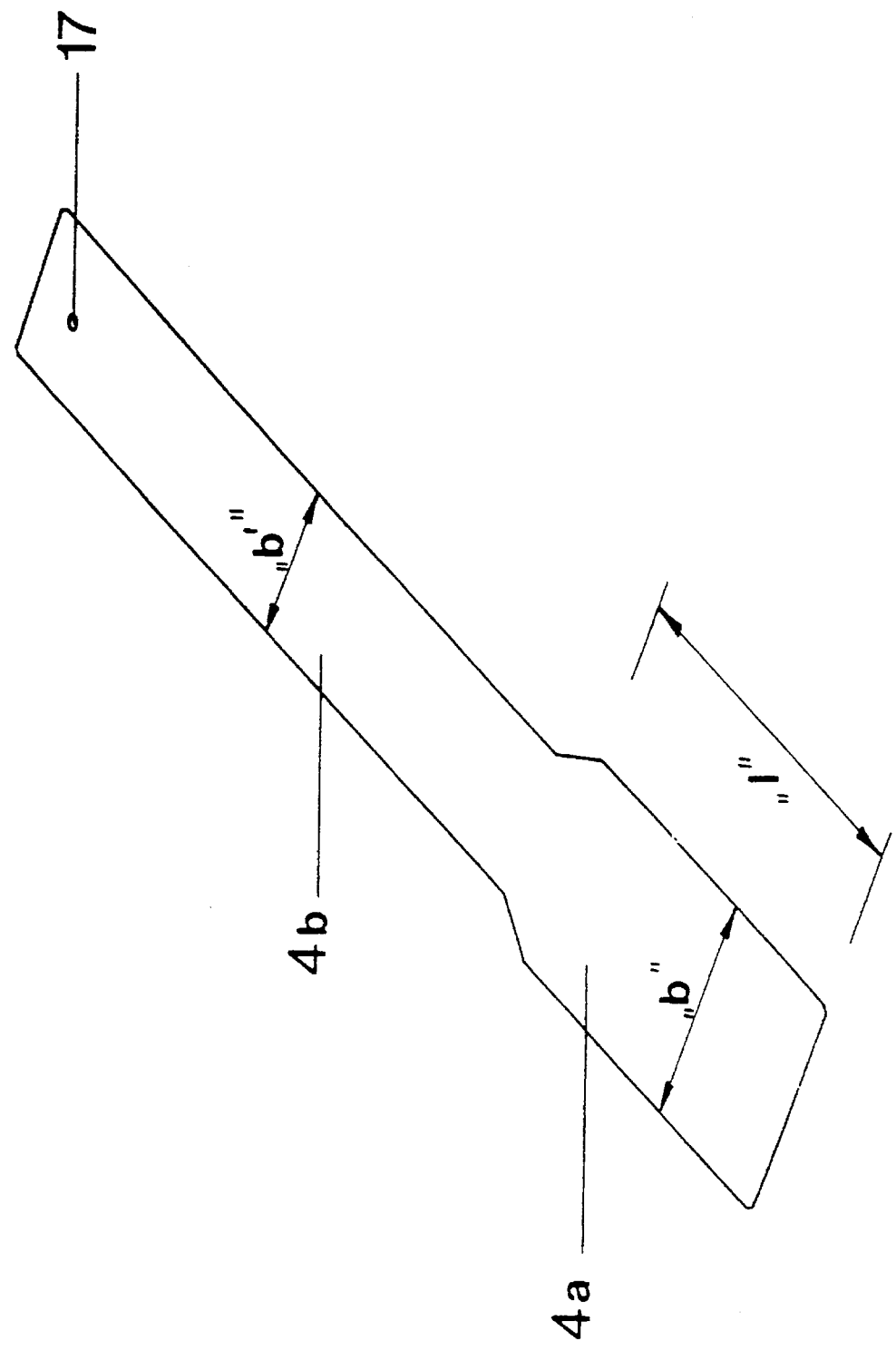
FIG. 3 is a perspective view of a closure element comprising a flexible slide plate.
Figure 5:
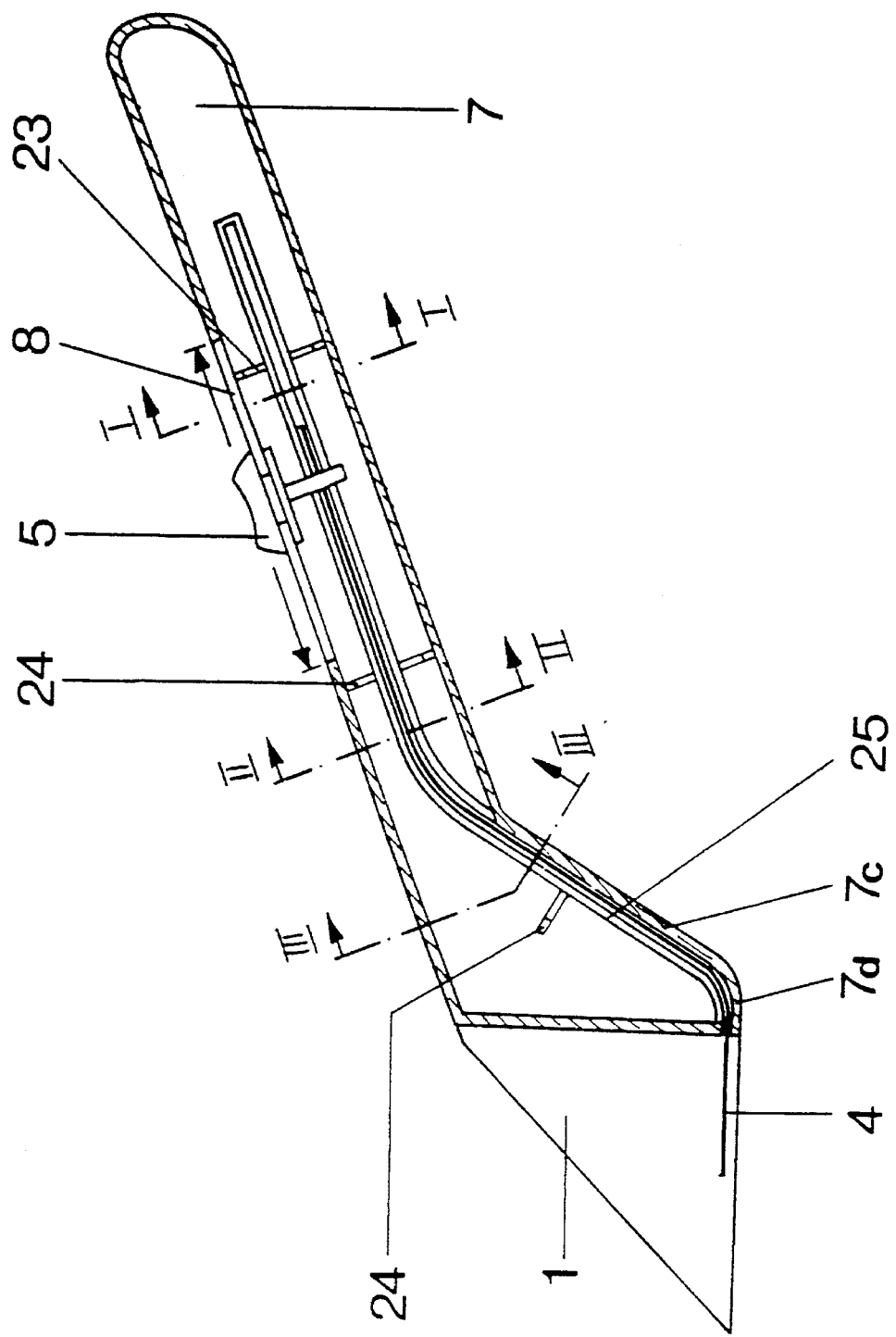
FIG. 5 is a longitudinal sectional view of the catching device of the present invention for the simplified representation of the guidance of the flexible slide plate.
Figure 10:
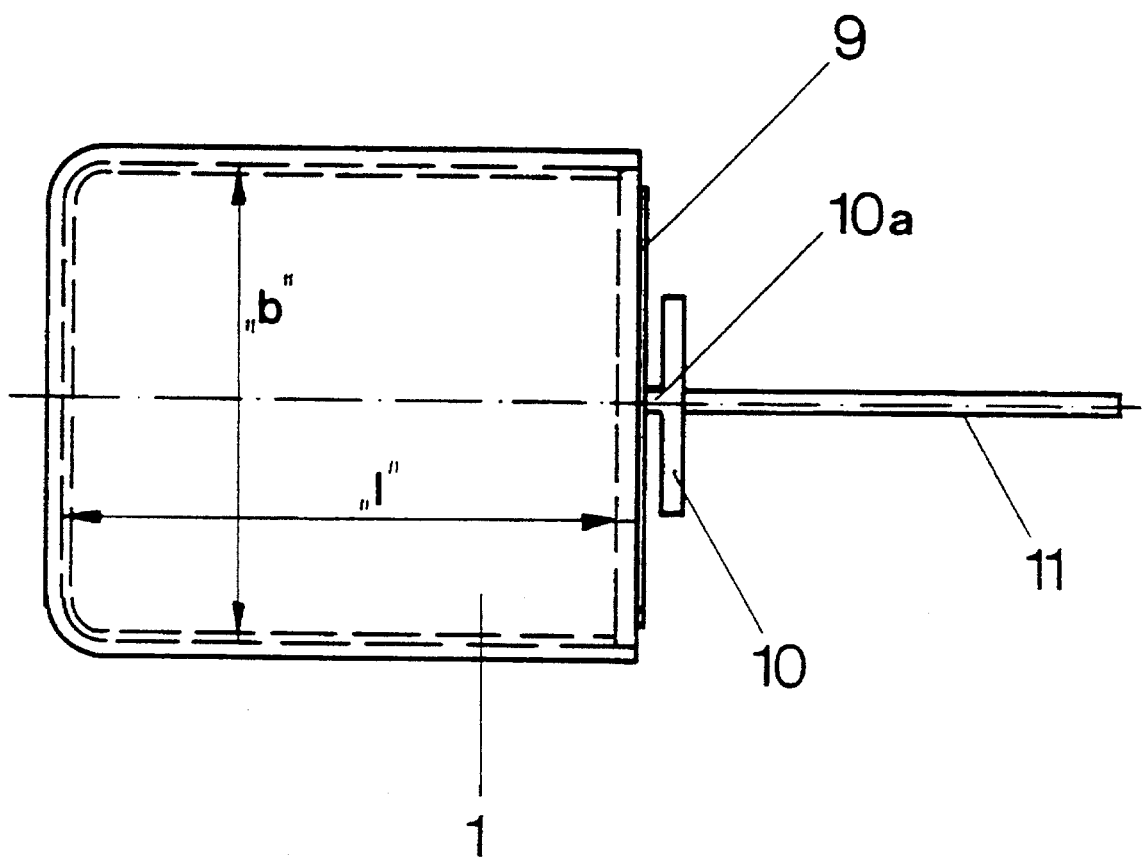
FIG. 10 is a plan view of the catching apparatus.

As shown best in FIG. 2, within grip 7, flexible slide plate 4 is slidingly guided, so that during its movement in the direction of the arrow A it closes opening 6 and during movement of the flexible slide part 4 in the direction of the arrow B it again frees opening 6. With reference to FIG. 3, flexible slide plate 4 preferably has a narrow sliding portion 4*b* and a wide sliding portion 4*a*. The length l of the wide sliding portion 4*a* optimally corresponds or is slightly longer than the length l of opening 6 in catching apparatus 1 (FIGS. 2 and 3). Further, the width b of the closing portion 4*a* of the flexible slide 4 corresponds to the width b of the catching opening 6 (FIGS. 3 and 10). With reference to FIGS. 2 and 5, the widened portion 7*a* of the grip 7 extends with the bevel 7*c* and a downturned part 7*d* over an area roughly corresponding to the length l of the wide closing portion 4*a* of the flexible slide plate 4, so that portion 4*a* can be received in the grip 7 when the flexible slide plate 4 is retracted or the catching apparatus 1 is open. This construction makes it possible to give the housing 1 a relatively wide construction for receiving larger insects or beetles and for improving the trapping characteristics, but still obtain a narrow, handy grip 7.

Slide plate 4 preferably comprises a thin plastic, optimally having a thickness of about 0.3 mm. However, it is also possible to have thicker or thinner dimensions, namely from about 0.1 to about 0.5 mm, or more. It is also possible to use as the material for the flexible slide plate 4 metal, paper or a combination of metal and paper or plastic and paper.

At the rear end narrow sliding portion 4*b*, slide plate 4 has a bore 17, in which engages a driving pin 18 located on the operating button 5. On its side facing grip 7, button 5 is preferably provided with a cross-sectionally T-shaped guide piece 19, whose vertical web 19*a* is laterally guided in the movement slot 8 formed on the top of the grip 7. Suitably, button 5 is guided in the vertical direction on the wall of the grip 7 between the underside of the button 5 and respective flanges 19*b* of the guide piece 19. Driving pin 18 shaped onto the T-shaped guide piece is also provided with a hold-down device 21, which is supported on the top of the flexible slide plate 4. The length of the movement slot 8 preferably roughly corresponds to the length of the wide closing portion 4*a* of the flexible slide plate 4, plus the length of the web 19*a*. Slot 8 is suitably so positioned with respect to the connection between button 5 and slide plate 4 in the grip 7 that in the front stop position of button 5, opening 6 of housing 1 is just closed by the slide plate 4 and in the rear stop position of button 5 the leading edge of slide plate 4 just extends through the guide slot 16 and almost completely frees the catching opening 6.

Slide plate 4 is advantageously guided over the opening 6 of catching apparatus 1, in the downwardly direction of the widened portion 7*a* of the grip 7 and in the narrower grip portion of the grip 7 as will be described in greater detail relative to FIGS. 2, 5 and 8.

Figure 6A:
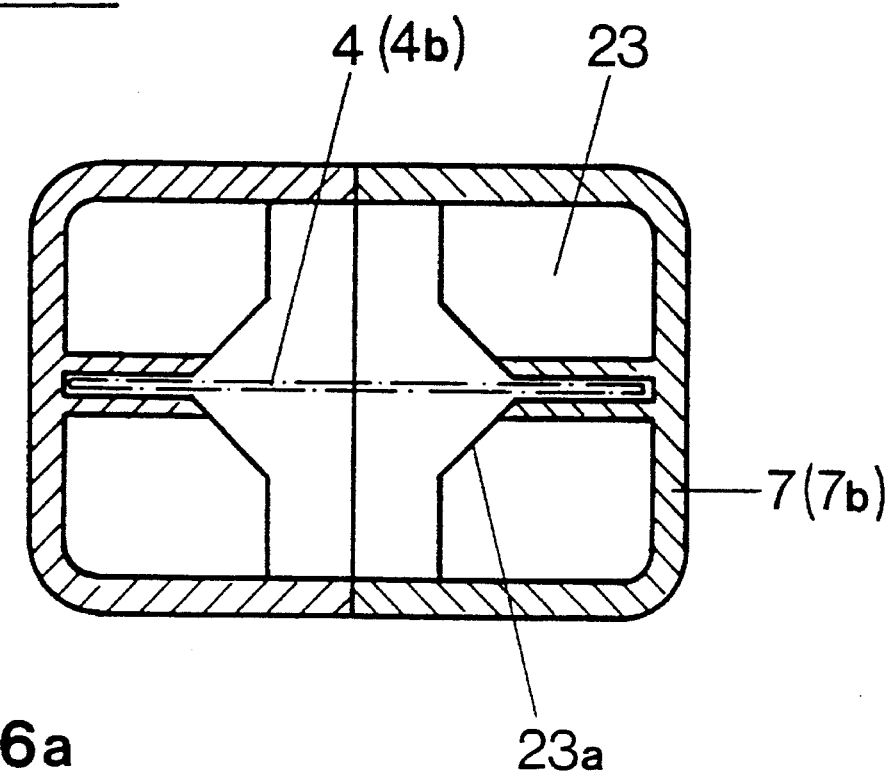
FIG. 6a is a sectional view along the line I—I of FIG. 5 in a simplified representation with the guidance of the flexible slide plate in the narrower grip portion.
Figure 6B:
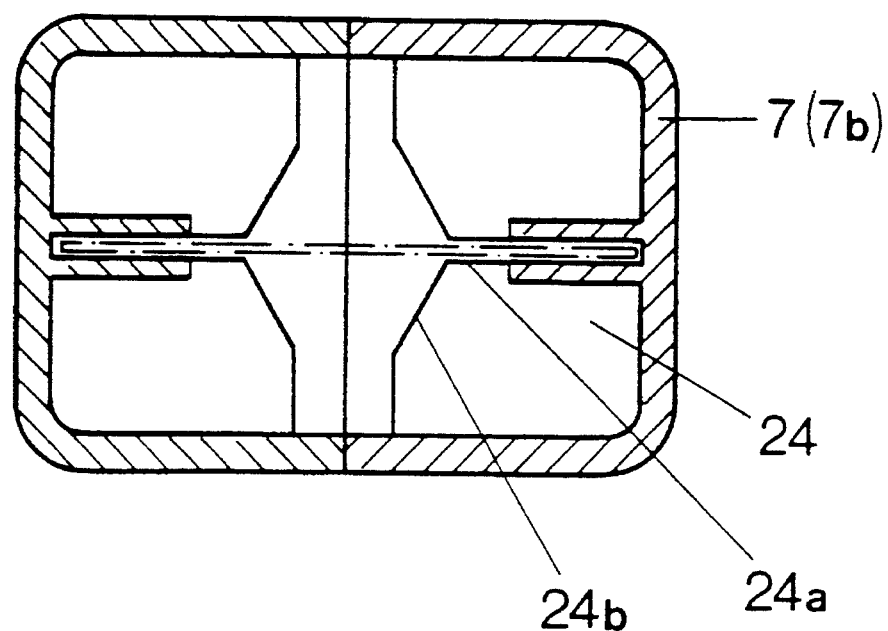
FIG. 6b is a sectional view along the line II—II of FIG. 5 showing the additional guidance of the flexible slide plate by guide ribs.
Figure 7:
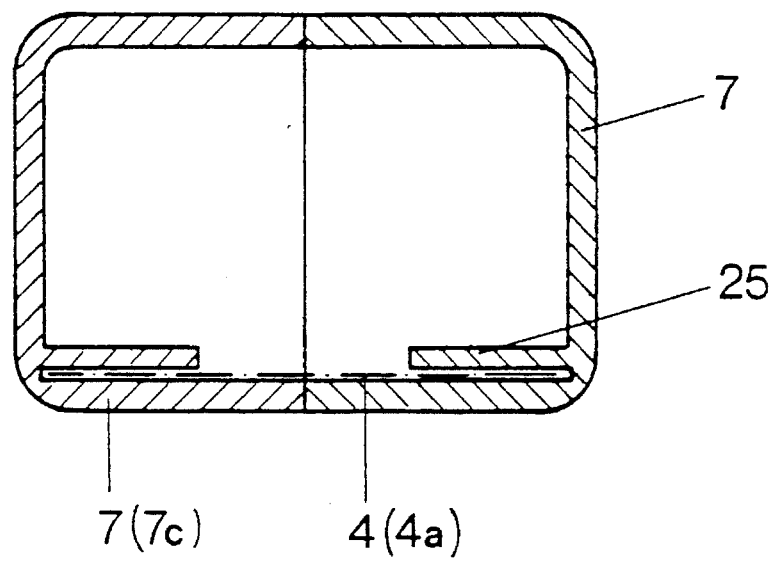
FIG. 7 is a sectional view along the line III—III of FIG. 5.

In particular, the guidance of the flexible slide plate 4 in the grip 7 up to the bevel 7*c* of the widened portion 7*a* takes place between guide rails 22 forming a guide slot shaped onto the side walls of the Grip halves 2 and 3. Ribs 23 are preferably provided for reinforcing the grip on the grip halves 2 and 3. Ribs 23 optimally have a bevelled edge 23*a* so that plate 4 can be easily introduced into the guide slot (cf. also FIG. 6*a*). In part, the reinforcing ribs are extended in the plane of the guide rails 22 (FIG. 6*b*), so that as a result guide ribs 24 are formed, which constitute an additional support for the slide plate 4 on the top and bottom, or optionally on one side only. Guide edge 24*a* of the guide ribs 24 can have different lengths and in particular in the vicinity of the bevel 7*c* and the downturned part 7*d* of the grip 7 can have a greater length, if desired. Ribs 23 and also the guide ribs 24 can in each case face one another or can be reciprocally displaced. The guide ribs 24 are also optionally provided with a bevelled edge.

In the vicinity of bevel 7*c* and downturned part 7*d* of widened portion 7*a* of grip 7 bent down towards the catching apparatus 1, slide part 4 is guided on its underside directly on the inside of the grip 7, whereas the guidance on the top of the slide plate 4 takes place laterally by the guide strips 25 and the guide ribs 24 and centrally on the lower edge of the guide plate 11 (not shown in FIG. 5). As is illustrated best in FIG. 9 by the broken line above the guide 11, the latter can also be extended, so as to also extend to the central guide area on the top of the flexible slide plate. In particular, such an extension 11*a* of the guide plate exists when there are two or more guides 11.

In the vicinity of opening 6, slide plate 4 is suitably guided such that as plate 4 is urged to close opening 6, plate 4 is slid in a upward sloping manner, and consequently runs under tension along guide edges 26 formed on the lower border of catching apparatus 1. This is optimally enabled by downturned part 7*d* being slightly upwardly guided on widened portion 7*c* in the direction of catching apparatus 1. The same function, i.e. the prevention of a giving way of slide plate 4 below the opening plane, is also preferably ensured by guide nose 27 having a triangular cross-section with its tip directed inwards shaped onto the lower edge of the catching apparatus. As can be seen best in FIG. 8, guide nose 27, preferably extends at least over part of the lateral edge of the catching opening 6, so as to counteract the tendency of the flexible slide plate 4 of giving way downwards at the start of the closing process.

Figure 8:
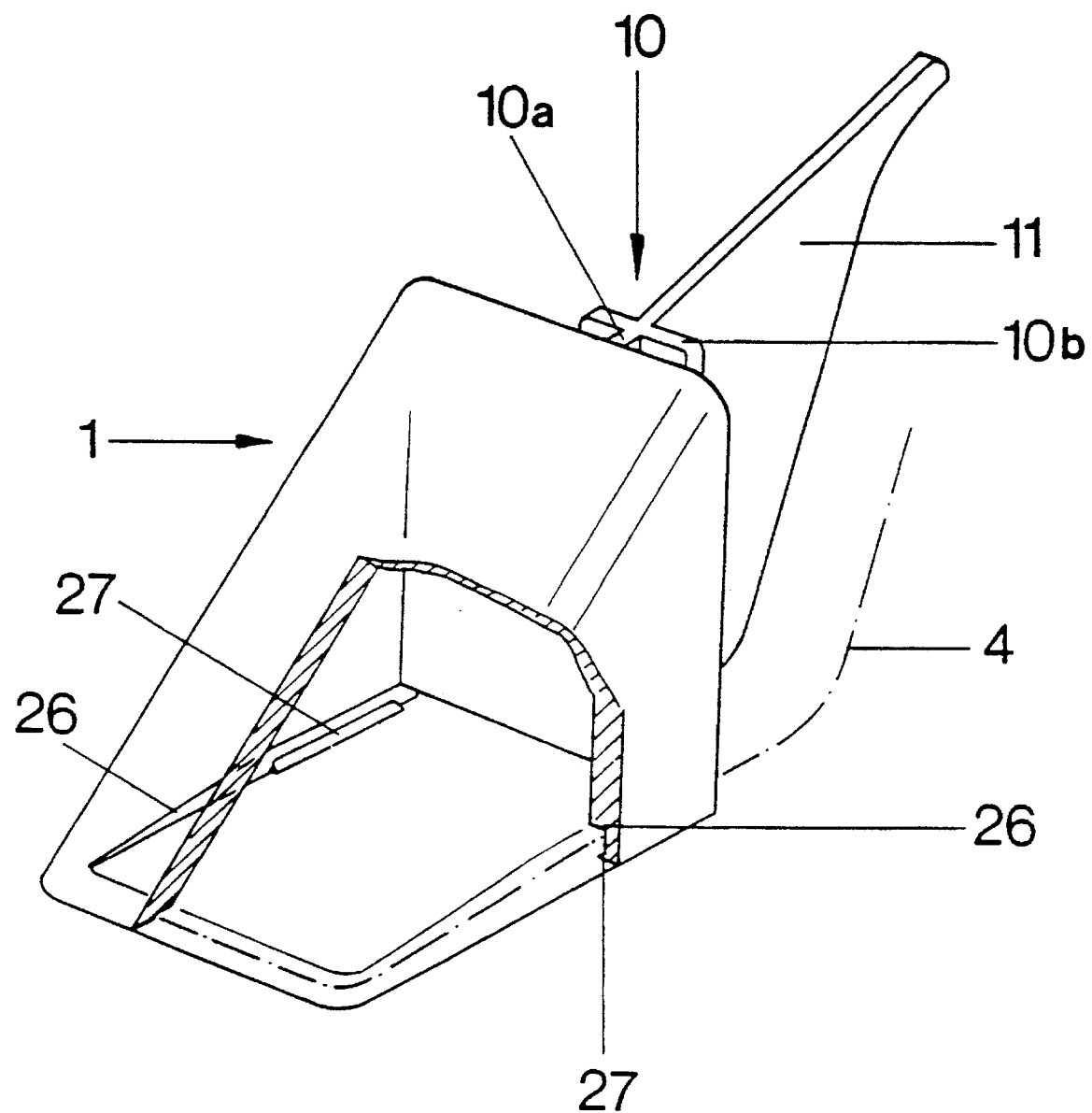
FIG. 8 is a view of the catching apparatus of the device of the present invention showing the guide elements for the flexible slide plate, as well as the clamping holder and guide plate in a perspective view.
Figure 9:
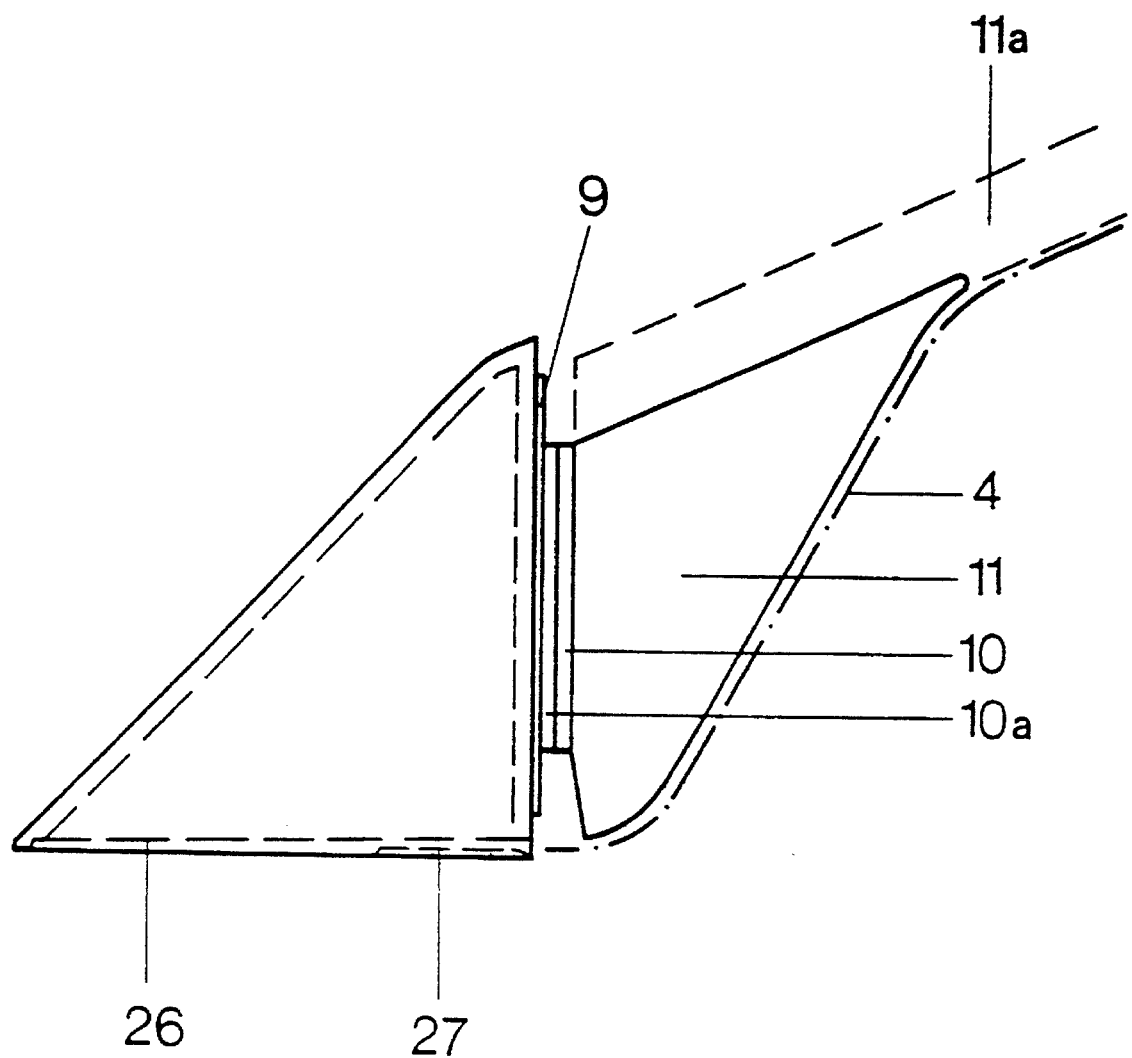
FIG. 9 is a side view of the catching apparatus.

FIGS. 8 and 9 also make it clear that the guide edge 26 increasingly passes towards the lower edge of the catching apparatus 1 in the closing direction and therefore enabling the front portion of slide plate 4 to terminate flush with the lower edge of opening 6. This ensures that during the closing process slide plate 4 is always guided with a certain tension along the downwardly tapering guide edge 26. Slide plate 4 continually approaches the surface on which catching apparatus 1 is placed or on which is located the insect to be caught, so as to be able to slide the insect onto the flexible slide plate without any injury risk to the insect or other small animal.

Figure 11:
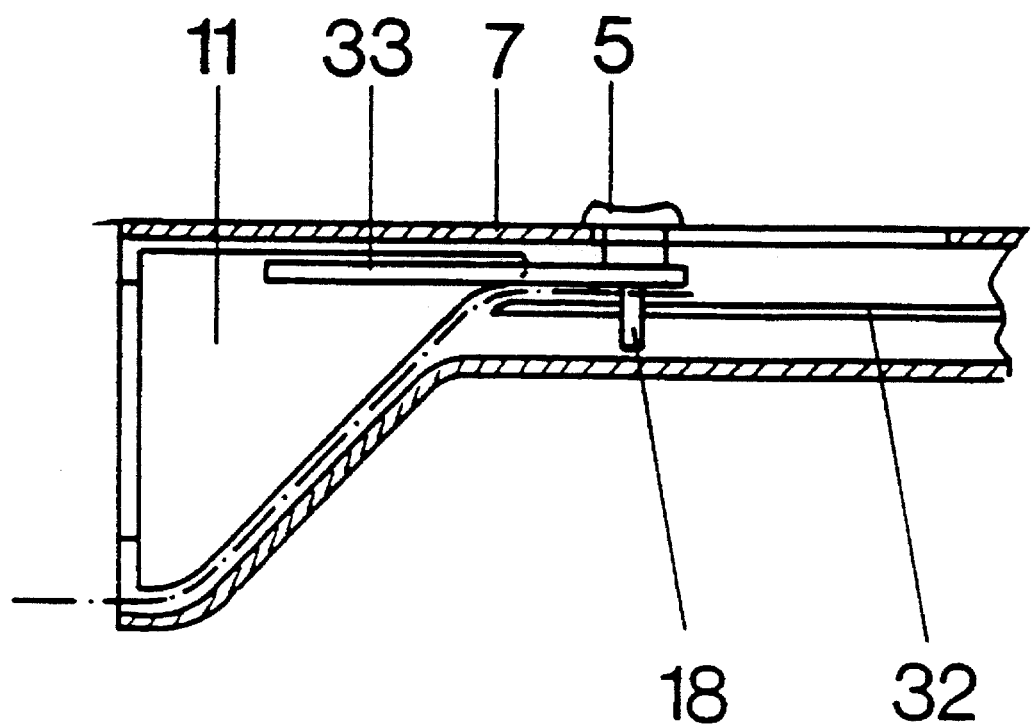
FIG. 11 is a sectional view of a portion of the catching device of the present invention in the vicinity of the grip with a first variant for guiding the flexible slide plate.
Figure 12:
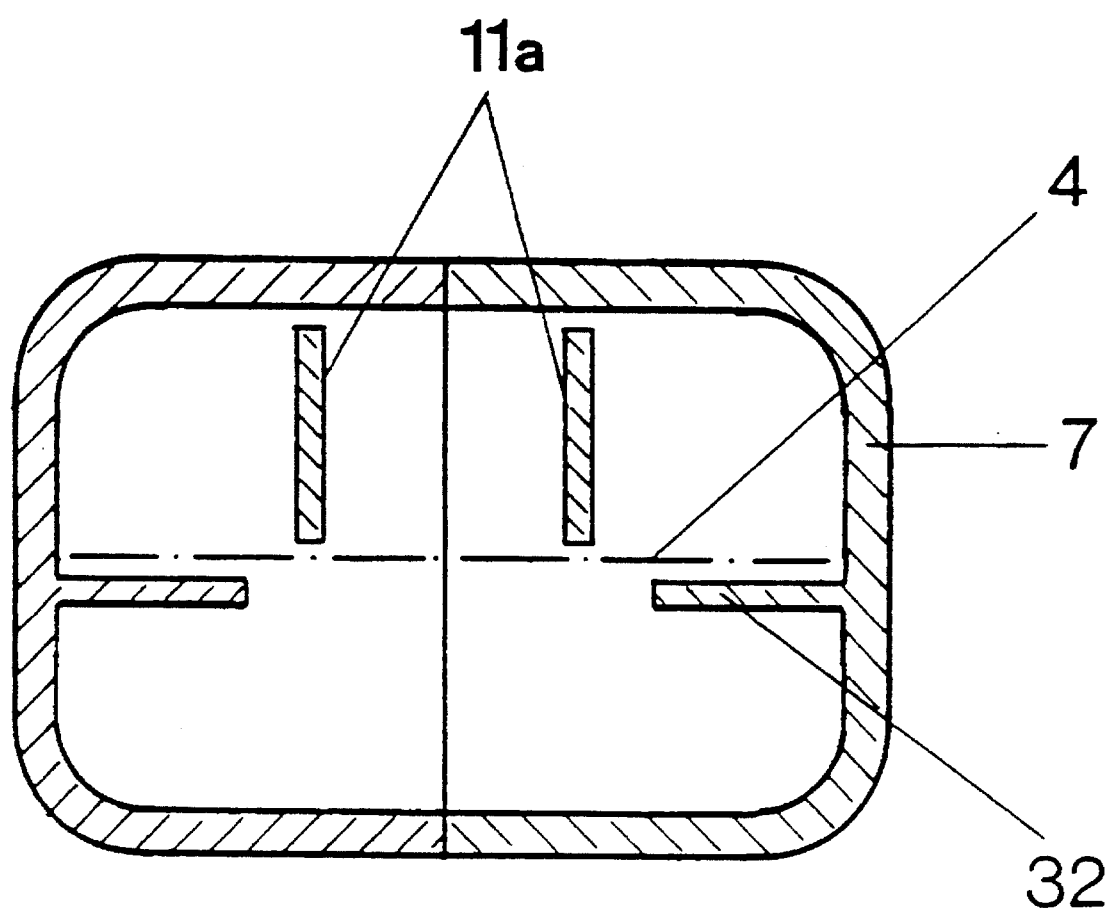
FIGS. 12 to 15 show further variants for guiding the flexible slide plate in the grip area, represented in a vertical section through the grip.

According to a variant for guiding the flexible slide plate 4 within the narrower grip portion 7*b* shown in FIGS. 11 and 12, on the side walls of the grip halves 2 and 3 is formed in each case a bearing ledge 32 for mounting and guiding the flexible slide plate 4. The guidance or holding down of the flexible slide plate 4 on the top in this case takes place either by the extensions 11*a* extending far into the grip 7 and optionally up to the driving pin in the rear stop position of the operating button 5, or by vertical webs positioned elsewhere.

The supporting or holding down of the flexible slide plate 4 on its top, both in the variant with bearing strips 32 shaped onto the side walls of the grip halves 2 and 3 and in other variants, can take place by means of strips 33 shaped on either side onto the driving pin 18 of button 5 and which, as shown in FIG. 11, may extend in the direction of the catching apparatus 1 and between them are able to receive the guide 11 or its extension 11a.

Finally, it is also conceivable to construct the aforementioned variant for the guidance of the flexible slide plate 4 in such a way that there are no bearing strips 32 and the lower guidance or bearing of the flexible slide plate 4 takes place directly on the grip bottom, as in the vicinity of the bevel 7c.

Figure 13:
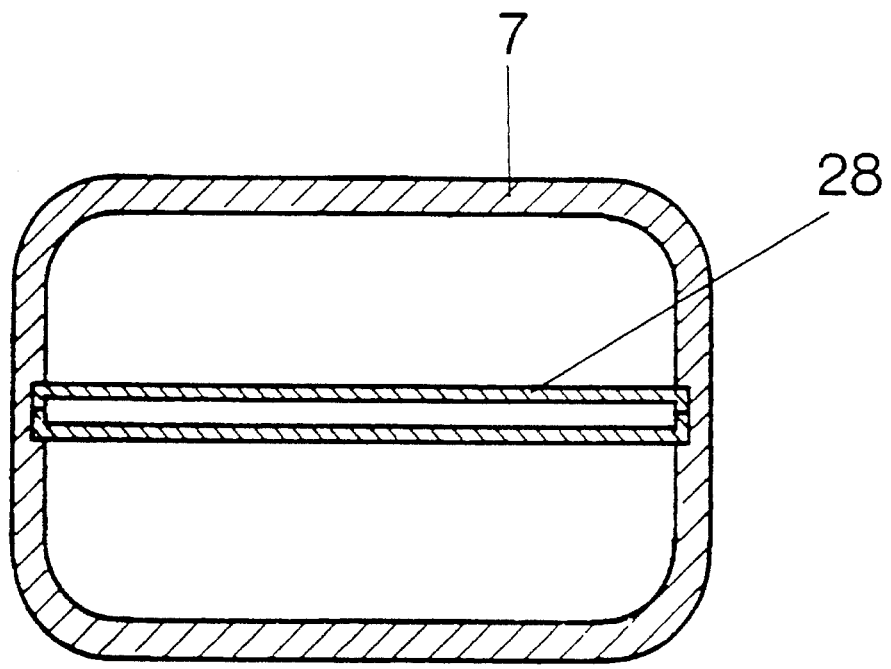
Figure 14:
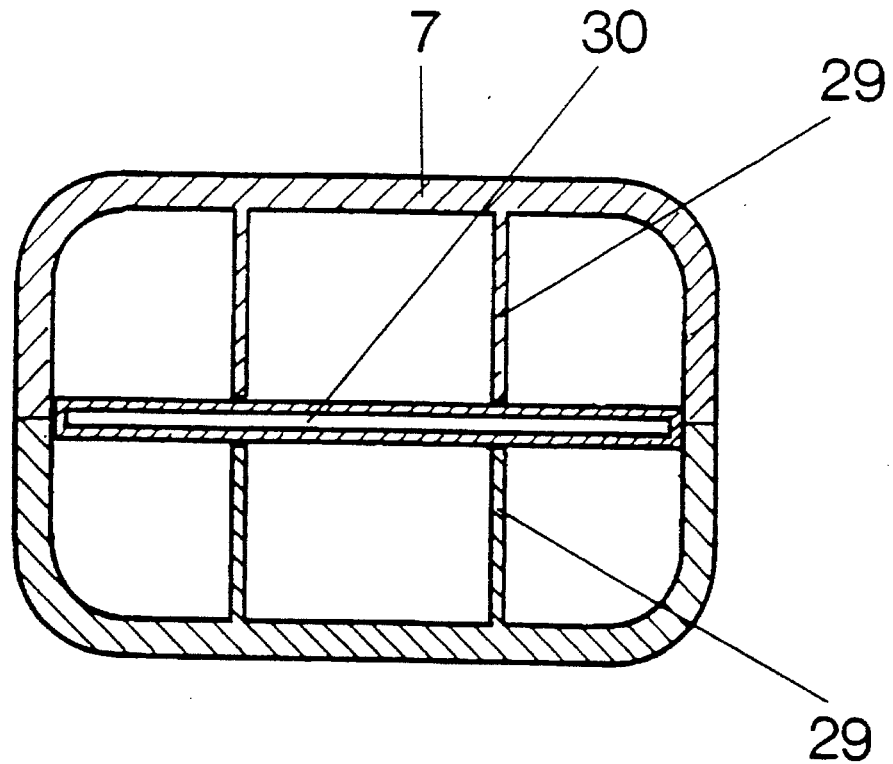
Figure 15:
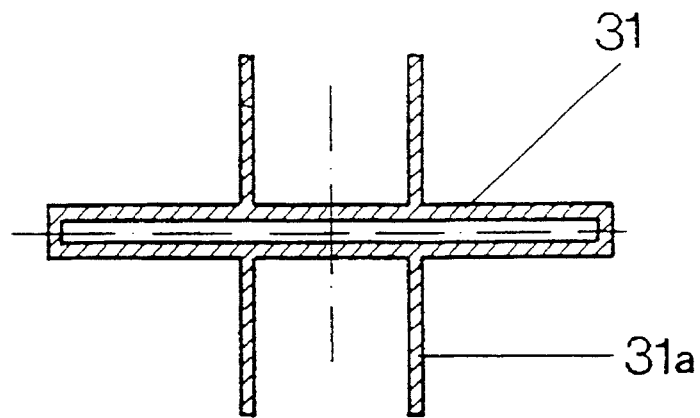

FIGS. 13 to 17 show variants for the guidance of the flexible slide plate 4 within the grip 7. The flexible slide plate is received in a closed guide casing 28 which, according to FIG. 13, is horizontally divided and held in the side walls of the grip 7. According to FIG. 14 in the case of a horizontally divided grip 7 onto its top and bottom are shaped inwardly directed webs 29, between which is fixed a one-piece, closed guide casing 13. Such a complete guidance of the flexible slide plate 4 in the horizontal and vertical directions is also achieved with the guide casing 31 shown in FIG. 15, which differs from the solution according to FIG. 13 in that here the webs 31a are shaped onto the guide casing 31 which can be inserted into grip 7.

Figure 16:
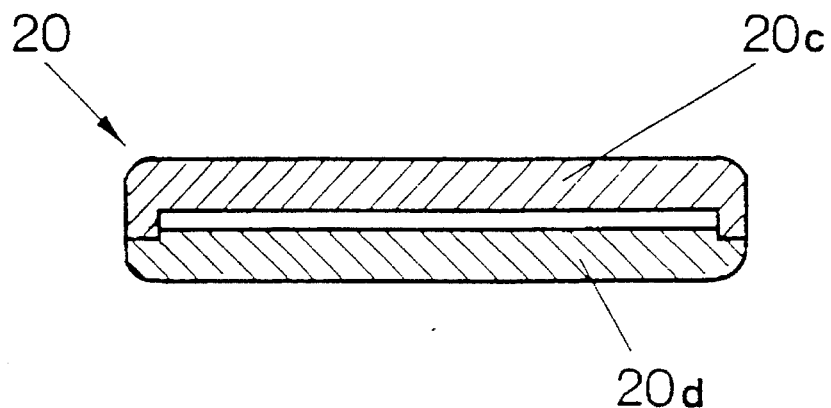
FIGS. 16 and 17 show a further variant for guiding the flexible slide plate with a vertical and horizontal dividing plane of the guide element.
Figure 17:
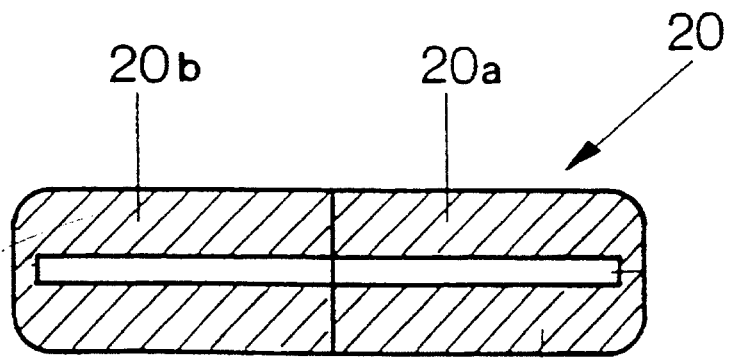

FIGS. 16 and 17 finally show variants, in which the grip is constructed as a compact, horizontally or vertically divided hollow body 20 with grip halves 20a, 20b or 20c, 20d, whose walls on the top and bottom are directly used for the guidance of the flexible slide plate 4.

Figure 18:
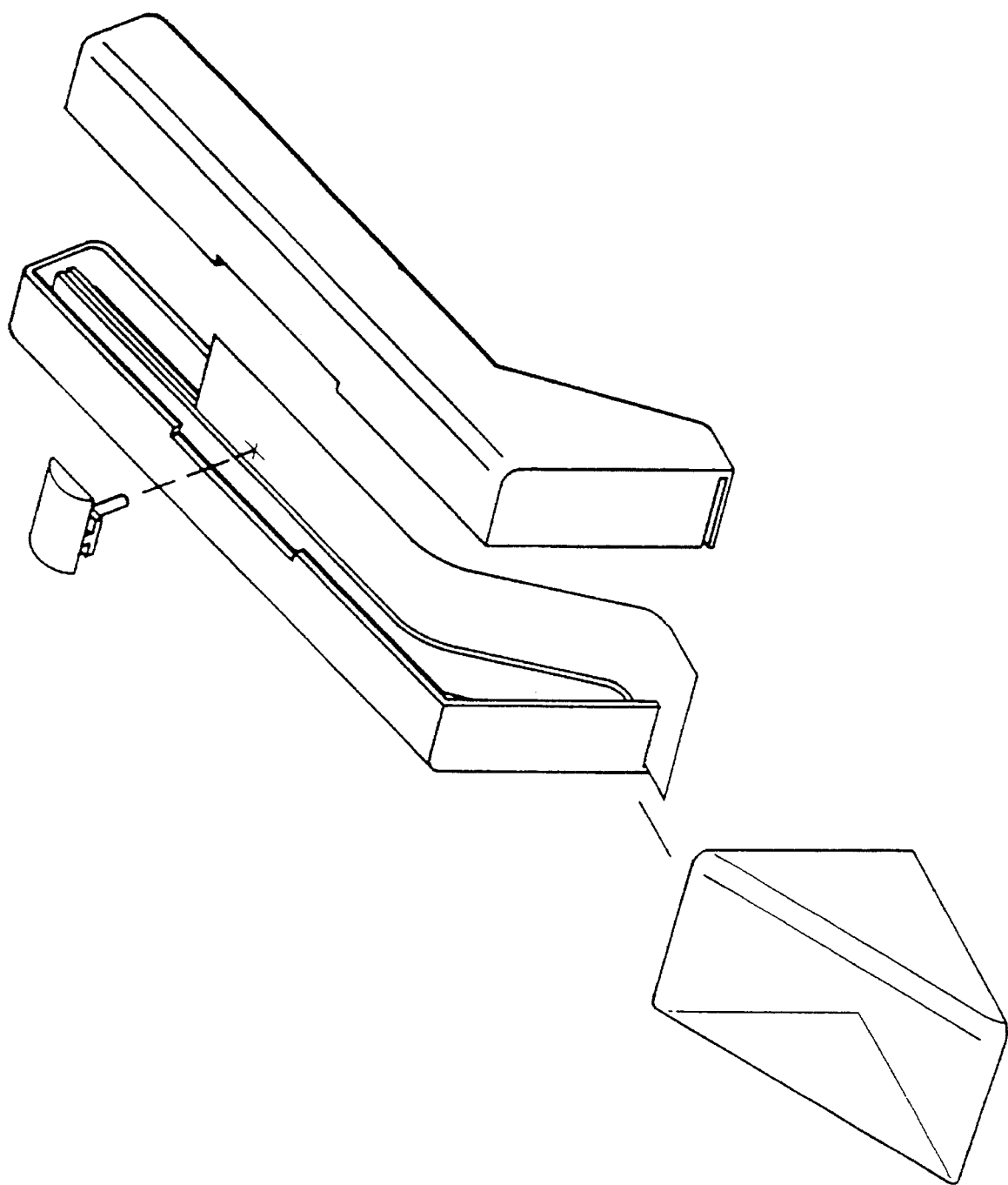
FIG. 18 is a simplified embodiment of the trapping device in a perspective, exploded view of the individual components.

FIG. 18 shows a highly simplified embodiment of a device for trapping, observing and transporting insects, spiders and similar small animals, in which the catching apparatus and grip have the same width throughout. Whereas the guidance of the flexible slide plate essentially corresponds to the previously described variants, the catching apparatus is constructed without a rear wall and is e.g. stuck to the end wall of the grip.

The assembly of the proposed insect catching device with a catching apparatus attachable to the gripping casing is very simple. After inserting the flexible slide plate 4 between the guides 22 and the guide ribs 24 with the aid of the bevelled edges 23a, 24a, as well as in the guide slot 16 in a grip half 2 or 3, the operating button is engaged and the connection between the driving pin 18 on the button 5 and the bore 17 in the flexible slide plate 4 is formed. The catching apparatus 1 with the T-shaped clamping holder 10 is then engaged on the end wall and subsequently the second grip half is fitted connected to the first half.

An insect is caught by placing the catching apparatus 1 with the catching apparatus opening over the insect and the gradual sliding of the button 5 towards the catching apparatus 1. Slide plate 4 is moved forwards by means of the driving pin 18 and the catching opening 1 is closed. On closing, slide plate 4 moves very close to the bottom, so that the insect passes in uninjured manner into the collecting apparatus 1, where it can be observed for instructional purposes. In order to improve the observation possibilities, on the transparent catching apparatus is placed a preferably rectangular viewing lens with triangular side parts in accordance with the shape and size of the catching apparatus. The insect taken up in the above-described manner can be released uninjured into the countryside again at another location by drawing back the operating button 5 and consequently opening the catching opening 6.

Figure 19:
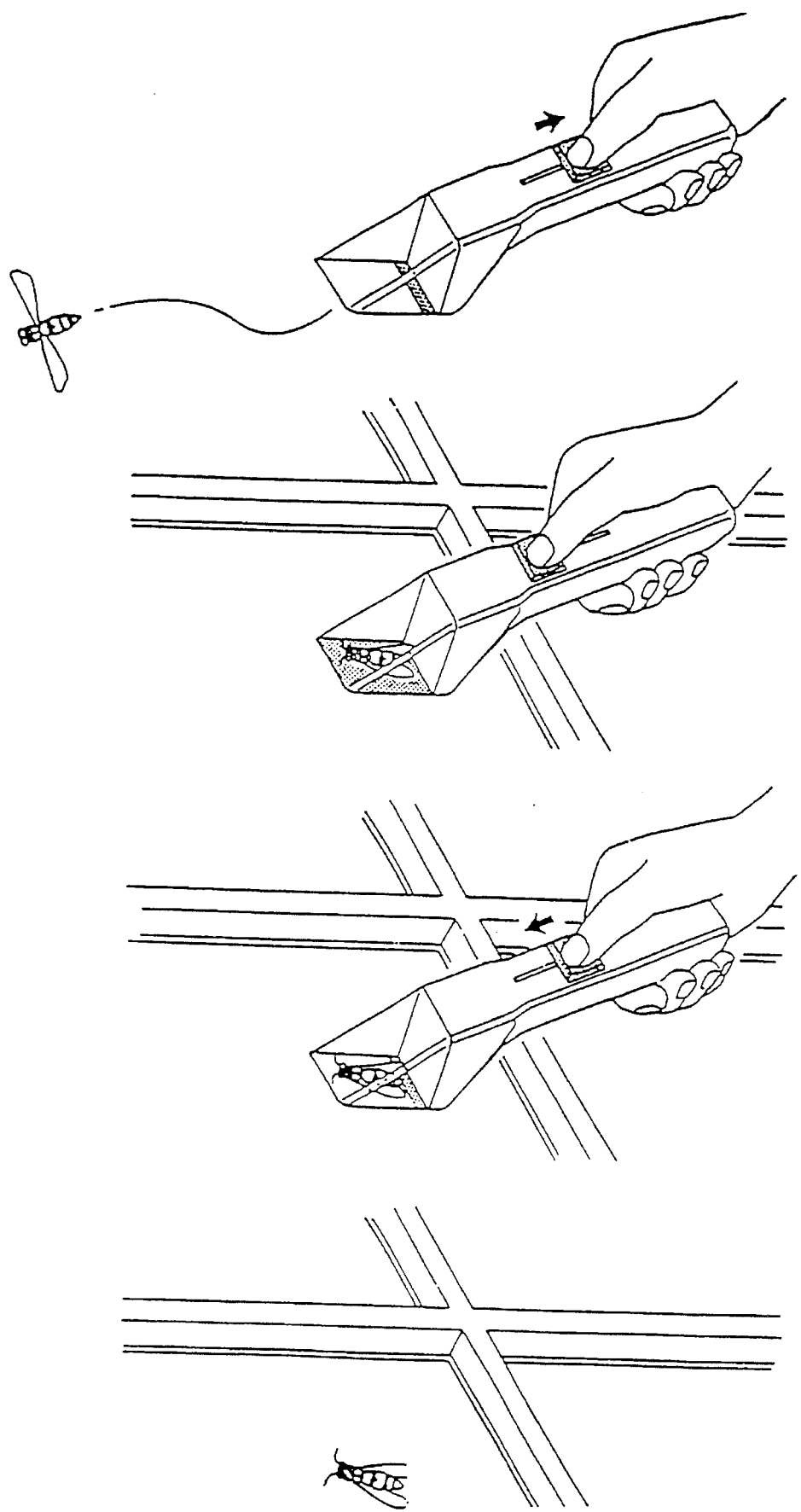
FIGS. 19 and 20 show in each case a sequence of four (4) representations for illustrating the trapping and release of insects using a catching device according to the present invention, firstly on a windowpane and secondly on the ground.
Figure 20:
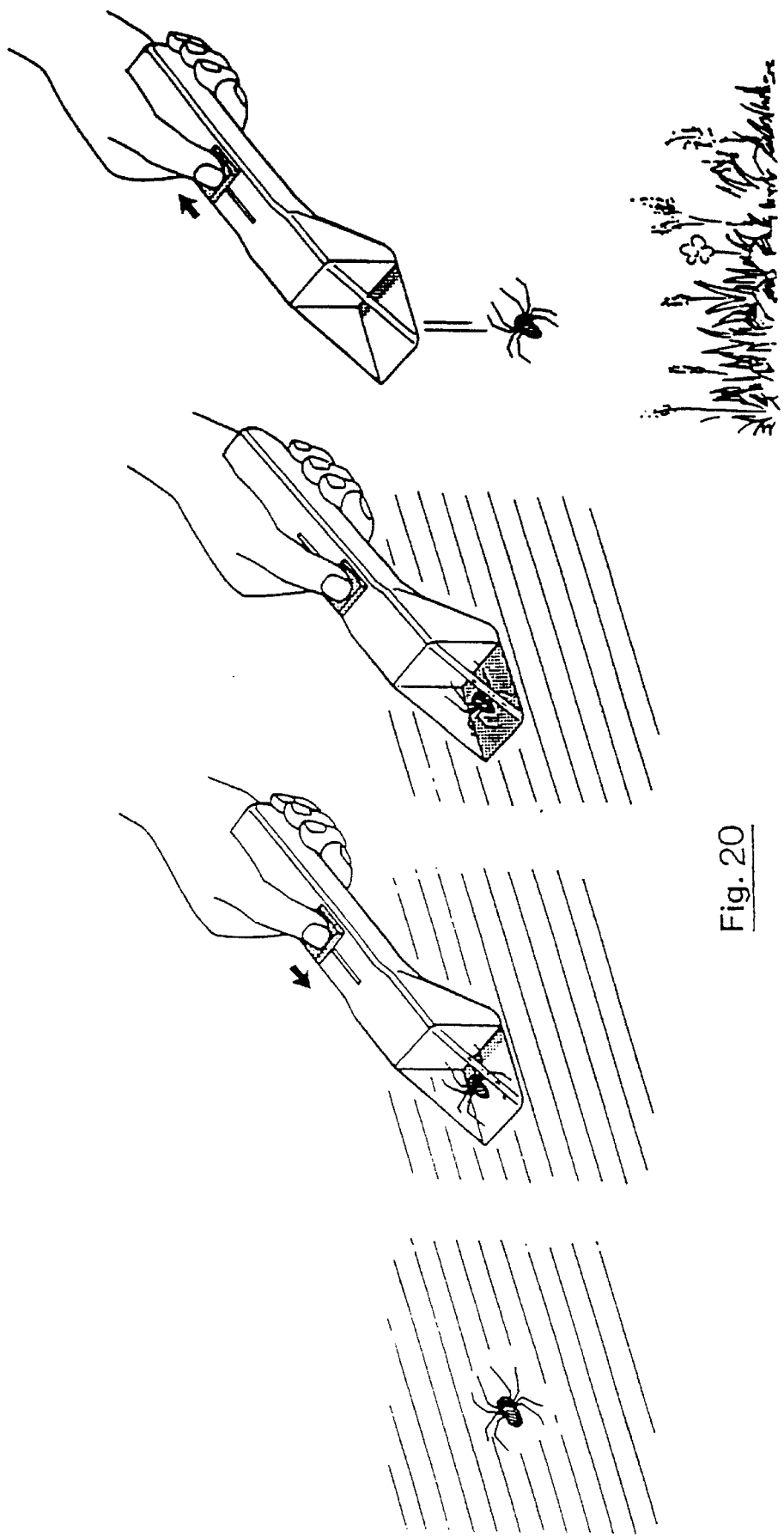

The described handling of the catching device for catching insects on a windowpane is shown in FIG. 19 and on the ground in FIG. 20, followed by the release of the insect.

It will be understood that the above description is of preferred exemplary embodiments of the present invention, and that the invention is not limited to the specific form shown and described herein. For example, the configuration of the catching apparatus or the supports contained therein may be modified in a variety of ways, as are now known or hereafter devised by those skilled in the art. Further, various alternative configurations of the catching housing may be readily incorporated by those skilled in the art. These and other modifications may be made in the design and arrangement of the elements within the scope of the invention, as expressed in the appended claims.

What is claimed is:

1. A device for trapping, observing and transporting insects, spiders and other small animals, comprising a catching apparatus open on one side and closable with the aid of a flexible slide plate and a grip connected thereto, in which the flexible slide plate is guided in a curved path towards the catching opening of the catching case and which is displaceable by an operating button, wherein said flexible slide plate is guided in a first portion of said grip by guide strips formed in the sidewalls of said grip portion, and wherein said flexible slide plate is guided about the curved path in a second portion of said grip by its underside contacting a bottom portion of a bevel of the grip and by its top side contacting said guide strips.

2. A device for trapping, observing and transporting insects or other small animals comprising:

a catching apparatus open on one side thereof;

a flexible slide plate moveable to close said open side of said catching apparatus;

a grip connected to said catching apparatus, said grip having guide rails formed in the sidewalls of said grip portion for guiding said slide plate within said grip along a curved path;

an operating button engageable with said slide plate for causing movement of said slide plate;

wherein said slide plate is supported on its top and bottom throughout the movement of said slide plate.

3. The device according to claim 2, wherein said grip has a grip portion and a transfer portion, said grip portion having a width narrower than the width of said catching apparatus.

4. The device according to claim 3, wherein said transfer portion has a width substantially the same as the width of said catching apparatus.

5. The device according to claim 2, wherein said means for guiding said slide plate further comprises a bevel positioned in said transfer portion of said grip for supporting the underside of said slide plate and corresponding guide strips positioned in said transfer portion of said grip for supporting the upperside of said slide plate.

6. The device according to claim 2, wherein said guide rails are supported by reinforcing ribs, each having a bevelled edge, and wherein said means for guiding said slide plate further comprises said bevelled edges of said ribs such that said slide plate is further supported on one side thereof.

7. The device according to claim 5, wherein said means for guiding said slide plate further comprises a nose shaped internally onto at least a part of the lateral edges of said catching opening in the region of the junction between said catching apparatus and transfer portion.

8. A device according to claim 4, wherein the width of said flexible slide plate in the region of said slide plate which serves to close said opening approximately corresponds to the dimension of said transfer portion of said grip and the width of said slide plate in the region of said grip portion is less than the width of said slide plate in said transfer portion of said grip.

9. The device according to claim 2, wherein said slide plate includes a bore at the rear end of its sliding portion and said operating button includes a driving pin suitably configured to be insertable into said bore to form an operative engagement between said button and said slide plate.

10. A device according to claim 2, wherein said flexible slide plate comprises a plastic or metal film.

11. A device according to claim 10, wherein the thickness of said film is between about 0.1 and about 0.5 mm.

12. A device according to claim 2, wherein said catching apparatus is constructed as a separate component attachable to the end wall of said grip.

13. A device according to claim 2, wherein said catching apparatus includes means for preventing rotation of said catching apparatus with respect to said grip.

14. A device according to claim 13, wherein said means for preventing rotation of said catching apparatus comprised a T-shaped housing.

15. A device according to claim 13, wherein the catching apparatus has on the outside of its rear wall a shallow protuberance and the opposite end wall of said grip has a depression corresponding to said shallow protuberance.

16. A device according to claim 2, wherein said catching apparatus comprises a clear, transparent plastic.

17. A device for trapping insects or small animals comprising:
- a grip having top, bottom and first and second sides, having at one end a grip portion and at the other end a transfer portion, said bottom side extending downward at the junction of said grip portion and said transfer portion, said first and second sides each carrying upper and lower lateral guide rails defining a curved path;
- a housing of a generally triangular configuration having a top, bottom, back and first and second sides, said bottom being open, said back being generally orthogonally attached to said bottom, and top connecting said bottom and back, and said first and second sides spanning therebetween;
- a closing plate slidable from an open position substantially within said grip to a closed position wherein said plate closes said open first side, said closing plate being supported in said grip by said guide rails along said curved path as said plate is slid from said open position to said closed position.

18. The device according to claim 17, wherein an inclined track is defined in said first and second sides of said housing in proximity to said bottom.

19. The device according to claim 18, wherein said track is elevated in the region of said back and substantially plush with said bottom in the junction of said bottom and said top.

20. The device according to claim 19, further comprising at least one guide positioned at the back base of said track.

21. The device according to claim 20, further comprising at least one guide bevel in proximity of said curved path to support the underside of said closing plate as it is moved from said open to said closed position.

22. The device according to claim 21, further comprising slidable button engageable with said closing plate and supported by said top of said grip for moving said closing plate from said open to said closed position.

23. The device according to claim 17, wherein said grip portion has a width narrower than the width of said transfer portion and said housing.

24. The device according to claim 17, wherein said grip is formed of first and second halves, said first half detachably fixed to said second half.

25. The device according to claim 24, wherein said housing further includes T-shaped clamping holder affixed to said back, said holder engageable with said transfer portion of said grip.

26. A method for catching insects comprising the steps of:
providing a catching device including a grip and a catching housing having an open bottom, said grip and said housing combining to define an interior curved guide path, and a web movable within said grip from an open position to a closed position, said web being substantially supported by strips formed in the sidewalls of said grip, wherein said closed position said web covers said open bottom, said web being substantially supported by web supporting means within said grip and said housing for supporting the upper and lower surfaces of said web as said web is moved from said open position to said close position;

positioning said open bottom over an insect to be caught such that said insect is positioned within said catching housing; and moving said web of said catching device from said open position to said closed position to entrap the insect within said catching housing.

27. The method of claim 26, further comprising the step of moving said web from said closed position to said open position to effect release of said insect.

* * * * *